(12) United States Patent
Dobryden et al.

(10) Patent No.: US 8,258,937 B2
(45) Date of Patent: Sep. 4, 2012

(54) SYSTEM FOR TRANSMITTING DATA BETWEEN A HYBRID ELECTRIC VEHICLE AND A REMOTE TRANSCEIVER

(75) Inventors: Allen D. Dobryden, Ann Arbor, MI (US); William P. Perkins, Dearborn, MI (US); Ryan Skaff, Farmington Hills, MI (US); Derek Hartl, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 507 days.

(21) Appl. No.: 12/481,001

(22) Filed: Jun. 9, 2009

(65) Prior Publication Data

US 2010/0308986 A1 Dec. 9, 2010

(51) Int. Cl.
*B60Q 1/00* (2006.01)

(52) U.S. Cl. ............. 340/438; 340/439; 340/426.13; 340/426.14; 340/426.35; 340/426.36; 340/539.19

(58) Field of Classification Search ............ 340/438, 340/439, 426.13, 426.14, 426.15, 426.16, 340/426.35, 426.36, 425.5, 539.11, 539.19, 340/691.6, 5.61; 701/1, 29
See application file for complete search history.

(56) References Cited

U.S. PATENT DOCUMENTS

| | | | |
|---|---|---|---|
| 6,639,511 B2 * | 10/2003 | Haruna et al. | 340/426.13 |
| 7,215,243 B2 | 5/2007 | Rimkus et al. | |
| 7,224,261 B2 * | 5/2007 | Shimomura | 340/426.11 |
| 7,504,931 B2 | 3/2009 | Nguyen | |
| 2005/0099275 A1 | 5/2005 | Kamdar et al. | |
| 2007/0057781 A1* | 3/2007 | Breed | 340/457.1 |
| 2010/0045450 A1* | 2/2010 | Suzuki et al. | 340/438 |

OTHER PUBLICATIONS

Michael S. Rosenwald, for Hybrid Drivers, Every Trip Is a Race for Fuel Efficiency, The Washington Post, May 26, 2008.
Chris Woodyard, GM's New Key FOB Can Check Fuel Level, Tire Pressures, USA Today, Nov. 15, 2006.

\* cited by examiner

*Primary Examiner* — Hung T. Nguyen
(74) *Attorney, Agent, or Firm* — Frank MacKenzie; MacMillan, Sobanski & Todd, LLC

(57) ABSTRACT

A method of transmitting driver specific vehicle data includes entering driver specific hybrid electric vehicle (HEV) operating parameter settings for a plurality of drivers into a vehicle controller; identifying a vehicle driver; displaying driver specific HEV data within the vehicle; and configuring HEV operating parameters in accordance with the driver specific HEV operating parameter settings.

20 Claims, 2 Drawing Sheets

SYSTEM FOR TRANSMITTING DATA BETWEEN A HYBRID ELECTRIC VEHICLE AND A REMOTE TRANSCEIVER

BACKGROUND

The invention relates to a wireless vehicle communications system. In particular, the invention relates to an improved wireless transceiver for transmitting data to a hybrid electric vehicle (HEV) and receiving HEV status indicators.

Remote activation devices for use with vehicles are well known in the art. These devices often take the form of a small electronic FOB that may be conveniently carried by the vehicle operator, to which the vehicle operator may conveniently attach the vehicle keys. The FOB usually contains a radio transmitter that communicates with a receiver and control system of the vehicle. For example, when the user activates an "unlock" button on the FOB, the FOB sends a radio signal to the vehicle control system, which then causes one or more of the door locks to open.

Other known functions on the FOB include a lock, alarm, engine start, lights ON/OFF, and open trunk functions. Such FOBs also typically include a key attachment aperture. When one or more of the function buttons is depressed or otherwise activated by the user, the FOB sends wireless command signal to an associated nearby vehicle where the signal is received by an antenna coupled to a vehicle control system. The control system interprets the command signal received from the FOB and causes the corresponding vehicle subsystem to respond. For example, if the "unlock" button has been activated, the control system then causes a lock on a vehicle door to move from a locked to an unlocked position. There continues to be a need however, for additional functions and other improvements for remote control systems in vehicles, especially hybrid electric vehicles (HEV).

SUMMARY

The present application describes various embodiments of a method of transmitting driver specific vehicle hybrid electric vehicle (HEV) data into a vehicle. One embodiment of the method of transmitting driver specific HEV data includes entering driver specific hybrid electric vehicle (HEV) operating parameter settings for a plurality of drivers into a vehicle controller; identifying a vehicle driver; displaying driver specific HEV data within the vehicle; and configuring HEV operating parameters in accordance with the driver specific HEV operating parameter settings.

An advantage of an embodiment is that the preferred settings for different operators of the hybrid electric vehicle may be automatically set for each particular vehicle operator, and, as a particular operator prepares to drive the vehicle, this operator is provided with a unique personalized hybrid vehicle experience. Other advantages of the method of transmitting driver specific vehicle HEV data will become apparent to those skilled in the art from the following detailed description, when read in light of the accompanying drawings.

DETAILED DESCRIPTION

As used in the description of the invention and the appended claims, the word "powertrain" is defined as the combination of engine, transmission/transaxle and differential (rear-wheel drive) for a vehicle. The word "driveline" is defined as the components that connect the transmission/transaxle to the driving axle, including the universal/constant velocity joints and driveshaft/halfshafts.

Figure 1:
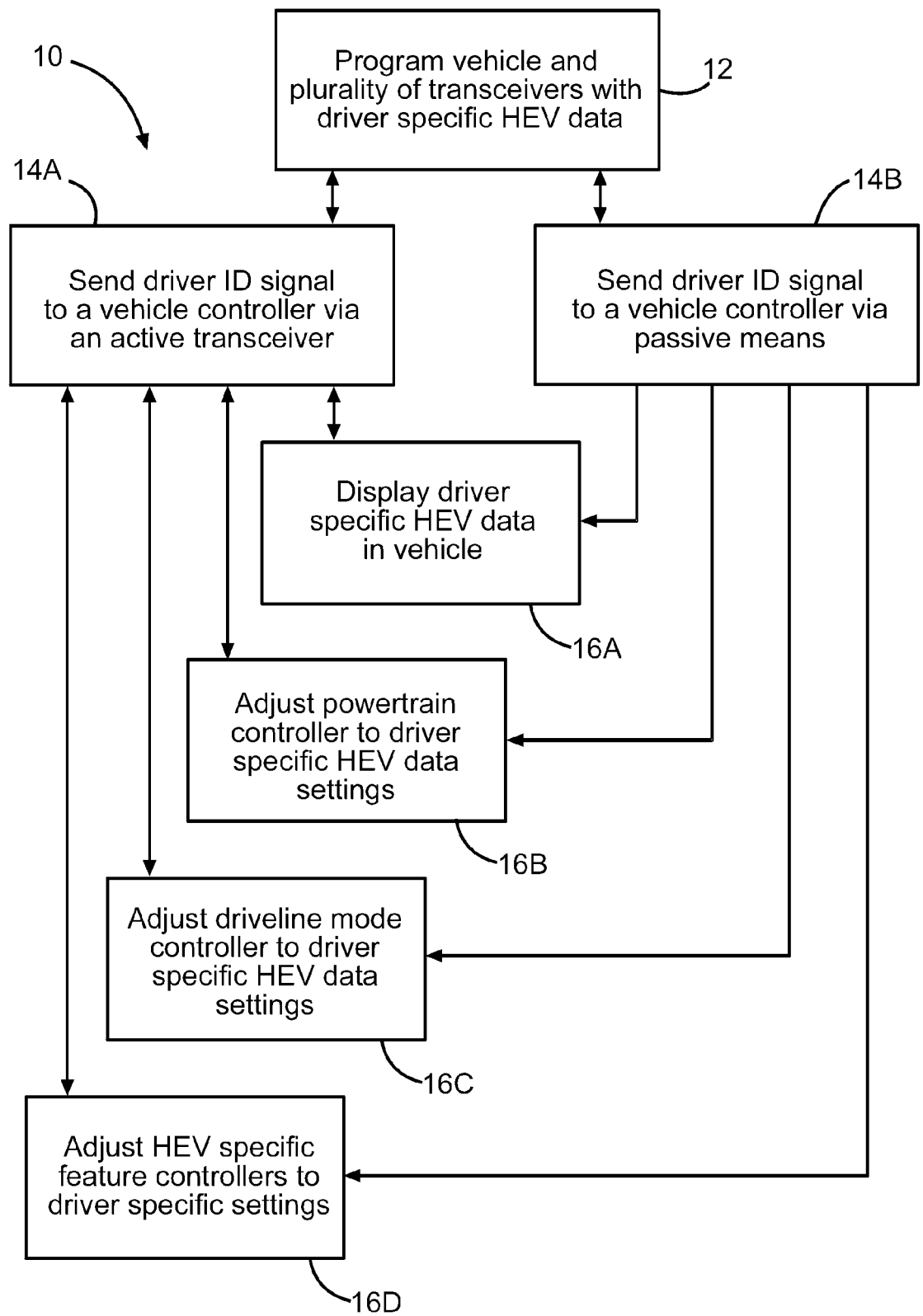
FIG. 1 is a flow diagram of a vehicle communications system.

Referring now to the drawings, there is shown at 10 in FIG. 1 the steps in an exemplary embodiment of a system for transmitting and receiving hybrid electric vehicle (HEV) status indicator data and driver specific settings between an HEV and a transceiver.

Figure 2:
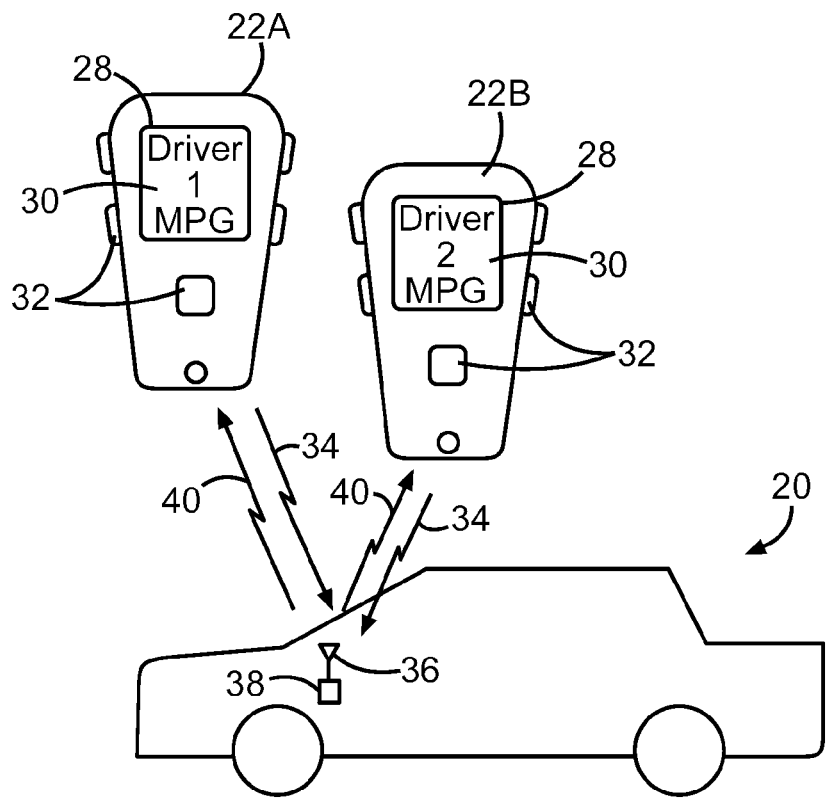
FIG. 2 is a schematic illustration of a plurality of wireless transceivers interacting with a vehicle according to an exemplary embodiment.
Figure 3:
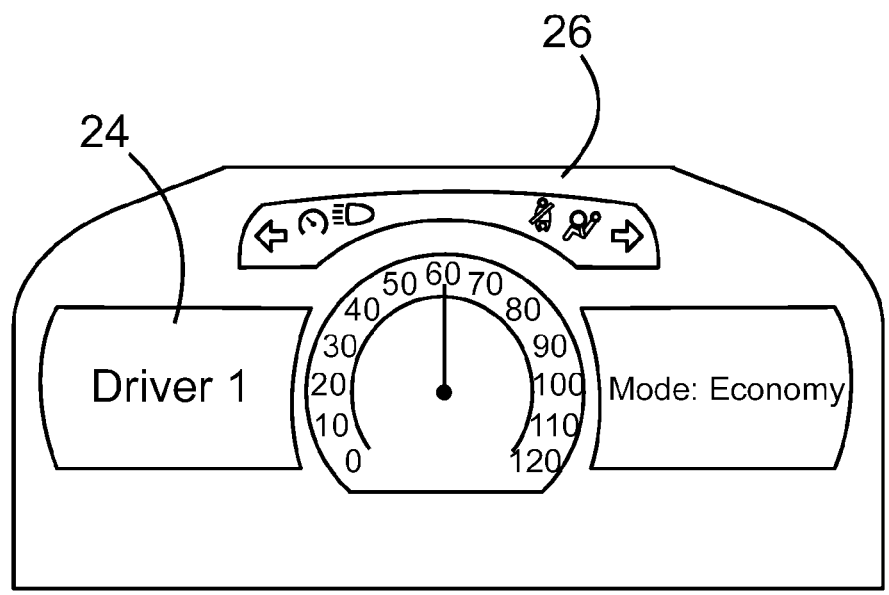
FIG. 3 is a schematic illustration of an instrument panel display according to an exemplary embodiment.

In a first step 12 of the system, a vehicle, such as a hybrid electric vehicle (HEV) 20 and a plurality of wireless communications devices or transceivers 22A, 22B, as shown in FIG. 2, are programmed with driver specific HEV data. For example, an electronic display configuration 24, such as in the instrument panel 26 may be programmed to display driver specific and HEV unique data, such as the cabin pre-condition mode, performance and fuel economy mode, battery charge, and the like, as shown in FIG. 3.

Additionally, various electronic control units (ECU) or controllers in the vehicle may be programmed with driver specific settings. For example, a powertrain controller may be programmed with driver specific settings for engine use and output, electronic power use, fuel economy, and other HEV specific and operator desired settings.

A driveline mode controller may also be programmed with driver specific settings for driveline components so as to pre-select a vehicle operating mode. For example, the driveline mode controller may be programmed with driver specific settings, such as to balance vehicle performance and fuel economy based on individual driver preferences.

Further, one or more controllers for HEV specific functions may be programmed with driver specific settings. By executing a remote start function for example, the vehicle 20 may enter a climate control pre-conditioning mode. For example, one driver may desire that the vehicle use the battery and/or plug-in power source to pre-condition the vehicle cabin, such as to a desired cabin temperature. Another driver may prefer that both the engine and the battery be used to pre-condition the vehicle cabin. The HEV specific controller may further be programmed with HEV unique navigation settings, such as identifying the location of the cheapest nearby gas station, and calculating the most efficient route. A vehicle controller may also be programmed to provide driver specific reminders, such as a reminder to a first operator to plug a plug-in hybrid electric vehicle (PHEV) into an electrical outlet after the ignition is turned off, and reminding a second operator to fill up the fuel tank in two days because gas prices are projected to decrease.

Each wireless transceiver 22A, 22B may be programmed such that it is associated with the driver specific data for one operator. Accordingly, the driver specific data stored in the various vehicle controllers may be wirelessly transmitted to a transceiver 22A, 22B. As shown in FIG. 2, the transceiver 22A, 22B may be a wireless device with a liquid crystal display (LCD) 28. The illustrated LCD 28 is an alphanumeric display configured to display data 30, such as driver specific data transmitted from the vehicle 20. Such driver specific data 30 may include any desired data, including HEV specific data 30 such as fuel economy. Any other HEV specific data available for display in the vehicle 20 may also be transmitted and displayed on the transceiver 22A, 22B. The transceiver 22A, 22B may include other types of visual displays to display selected driver specific data.

The illustrated transceiver 22A, 22B includes various command function switches, buttons, and/or other actuators 32. Such buttons 32 may be disposed at any location on the transceiver 22A, 22B.

The transceiver 22A, 22B may also be configured as a FOB. In the illustrated embodiment, each of the plurality of wireless transceivers, represented in FIG. 2 by the transceivers 22A, 22B, is associated with an individual driver. Each illustrated transceiver 22A, 22B transmits a unique identification signal to the vehicle. Alternatively, any one of the wireless transceivers 22A, 22B may be associated with multiple drivers and may, for example, be changed between unique driver settings and unique driver identification signals with a button 32 on the transceiver 22A, 22B.

In a second step 14A, and as further shown in FIG. 2, a first signal 34 identifying the vehicle driver may be sent to the vehicle 20 and received by an antenna 36 coupled to a vehicle controller 38. For example, a driver may actuate one or more buttons 32 on the transceiver 22A, 22B to send the first signal 34 to the vehicle 20. For simplicity, the antenna 36 is illustrated schematically in FIG. 2. It will be understood that the type of antenna 36 will be selected based on the signaling frequencies used.

In a third step 16A, upon receipt of the signal 34 identifying the vehicle driver, the vehicle controller 38 will reconfigure a display, such as the instrument panel display 24, such that the selected driver specific and HEV unique data settings are displayed in the vehicle 20, as shown in FIG. 3.

In an alternate third step 16B, upon receipt of the signal 34 identifying the vehicle driver, the powertrain controller may adjust the powertrain to driver specific HEV data settings. Examples of such driver specific HEV data settings include powertrain output, such as measured by engine torque, economy mode wherein performance may be balanced relative to fuel economy, and accelerator pedal response time. Any other function controlled by the powertrain controller may also be adjusted according to the selected driver specific HEV data settings.

In another alternate third step 16C, upon receipt of the signal 34 identifying the vehicle driver, the driveline mode controller may adjust the driveline to driver specific HEV data settings. Examples of such driver specific HEV data settings include choosing between a "sport mode" wherein vehicle performance is prioritized, and an "economy mode" wherein fuel economy is prioritized. For example, the driveline mode controller may determine the appropriate balance between operating in a two-wheel drive mode and an all-wheel drive mode, or determine when to engage traction control based on the driver's specific settings. Any other function controlled by the driveline controller may also be adjusted according to the selected driver specific HEV data settings.

In another alternate third step 16D, upon receipt of the signal 34 identifying the vehicle driver, any other HEV specific feature controller may adjust a selected HEV specific feature to driver specific HEV data settings. Examples of such driver specific HEV data settings include selecting HEV unique data to be displayed in the instrument panel 26, selecting the cabin precondition mode, and selecting the performance and fuel economy mode, as described herein above. Any other function controlled by an HEV specific feature controller may also be adjusted according to the selected driver specific HEV data settings.

It will be understood that the illustrated third steps 16A through 16D in the exemplary embodiment shown in FIG. 1 may occur independently, concurrently, or in any combination of two or more steps. During any of the steps 16A through 16D, a second or return signal 40 may be sent from the vehicle 20 to the transceiver 22A, 22B to transmit any desired driver specific data for display in the LCD 28 of the transceiver 22A, 22B. For example, fuel economy data may be transmitted from the vehicle 20 and displayed in the LCD 28 of the transceiver 22A, 22B.

Any desired data may be transmitted from the vehicle 20 and displayed in the LCD 28 of the transceiver 22A, 22B. For example, a driver may choose to have data from only the most recent key cycle (i.e., key-on, drive, key-off) displayed in the transceiver 22A, 22B. Alternatively, the driver may display data for the most recent trip log. For example, the driver may choose to display the most recent six days of driving data or data since the last time the driver reset the vehicle trip recorder. Further, the driver may also display a lifetime data summary, such as a summary of all data since the driver last drove the vehicle.

In an alternative of the second step 14B, the signal 34 identifying the vehicle driver may be passively transmitted to the vehicle controller 38. For example, a unique passive RF signal may be generated by an integrated key-head transmitter (IKT), a key FOB, a remote-start FOB, or any other suitable transmitter. Additionally, the signal 34 identifying the vehicle driver may be passively sent to the vehicle controller 38 through a keypad entry system, through the vehicle seat selection memory input, or through any other suitable passive input available in the vehicle 20. Biometric sensors, and non-key wireless communication devices such as a phone, PDA, or satellite communication device, may also be used to transmit the first signal 34 to identify the driver, and/or receive the second signal from the vehicle.

Advantageously, when more than one operator drives an HEV, each driver may pre-select and preset driver specific settings that will be stored by the vehicle separately from the settings of other drivers and automatically recalled upon entry to the vehicle, activation of the transceiver 22A, 22B, or initiation of any of the passive transmission means identified above.

In accordance with the wireless vehicle communications system 10 described, HEV operators may easily personalize the feel and function of their vehicles by prescribing or programming driver specific settings for HEV-unique vehicle features.

The principle and mode of operation of the wireless vehicle communications system have been described in its preferred embodiment. However, it should be noted that the wireless vehicle communications system described herein may be practiced otherwise than as specifically illustrated and described without departing from its scope.

What is claimed is:

1. A method of transmitting driver specific hybrid electric vehicle (HEV) data, the method comprising:
   entering driver specific HEV operating parameter settings for a plurality of drivers into a vehicle controller;
   identifying a vehicle driver;
   displaying driver specific HEV data within the vehicle that is processed and controlled by the vehicle controller; and
   configuring HEV operating parameters in accordance with the driver specific HEV operating parameter settings.

2. The method according to claim 1, wherein identifying a vehicle driver further includes providing a plurality of key FOBs, each key FOB having a transmitter configured to transmit one of a plurality of unique first electronic signals to the vehicle controller, each of the first electronic signals associated with one of the driver specific vehicle HEV operating parameter settings.

3. The method according to claim 2, further including transmitting a second signal from the vehicle controller to the key FOB; and
displaying the driver specific HEV data within a visual display in the key FOB.

4. The method according to claim 2, further including transmitting a second signal from the vehicle controller to the key FOB; and
displaying driver specific HEV data within a visual display in the key FOB, the driver specific HEV data including at least one of driver specific fuel economy, driver specific driving style, and driver specific efficiency information.

5. The method according to claim 2, further including transmitting the unique first electronic signal via an active RF signal from the key FOB.

6. The method according to claim 1, wherein identifying a vehicle driver further includes transmitting one of plurality of unique first electronic signals to the vehicle controller, each of the first electronic signals associated with one of the driver specific HEV operating parameter settings.

7. The method according to claim 6, further including transmitting the unique first electronic signal via a passive RF signal in an ignition key.

8. The method according to claim 6, further including transmitting the unique first electronic signal via a driver-entered vehicle keypad entry code.

9. The method according to claim 6, further including transmitting the unique first electronic signal when a vehicle memory seat selection is actuated.

10. The method according to claim 6, further including transmitting the unique first electronic signal via a biometric sensor in the vehicle.

11. The method according to claim 6, further including transmitting the unique first electronic signal via a wireless communication device.

12. A method of transmitting driver specific hybrid electric vehicle (HEV) data between a wireless communication device and a vehicle, the method comprising:
entering driver specific HEV operating parameter settings for a plurality of drivers into a vehicle controller;
providing a plurality of wireless communication devices, each wireless communication device having a transmitter and a receiver, the transmitter configured to transmit one of a plurality of unique first electronic signals to the vehicle controller, each of the first electronic signals associated with one of the driver specific HEV operating parameter settings;
transmitting a second signal containing driver specific vehicle data from the vehicle controller to the wireless communication device that is processed and controlled by the vehicle controller;
configuring HEV operating parameters in accordance with the driver specific HEV operating parameter settings; and
displaying driver specific HEV data within a visual display in the wireless communication device.

13. The method according to claim 12, further including transmitting a second signal from the vehicle controller to the wireless communication device; and
displaying driver specific HEV data within a visual display in the wireless communication device, the driver specific HEV data including at least one of driver specific fuel economy, driver specific driving style, and driver specific efficiency information.

14. The method according to claim 12, further including transmitting the unique first electronic signals via an active RF signal from the wireless communication device.

15. The method according to claim 12, further including transmitting the unique first electronic signals via a passive RF signal in an ignition key.

16. The method according to claim 12, further including transmitting the unique first electronic signals via a driver-entered vehicle keypad entry code.

17. The method according to claim 12, further including transmitting the unique first electronic signals when a vehicle memory seat selection is actuated.

18. The method according to claim 12, further including transmitting the unique first electronic signals via a biometric sensor in the vehicle.

19. The method according to claim 12, further including transmitting the unique first electronic signals via wireless communication device.

20. The method according to claim 12, wherein the wireless communication device is one of a key FOB, a remote start FOB, an integrated key-head transmitter, a phone, a personal digital assistant (PDA), and a satellite communication device.

* * * * *